United States Patent Office 3,378,606
Patented Apr. 16, 1968

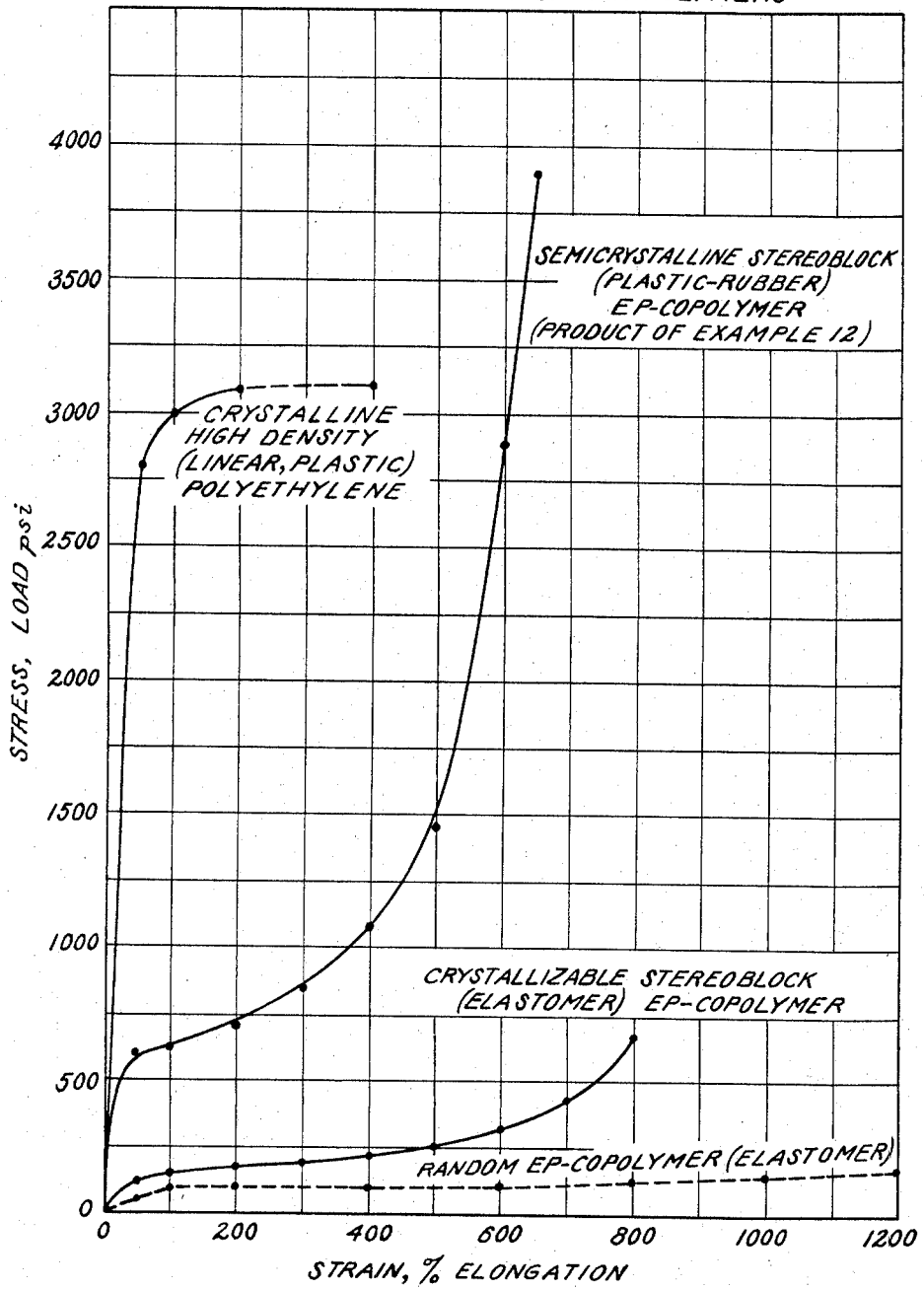

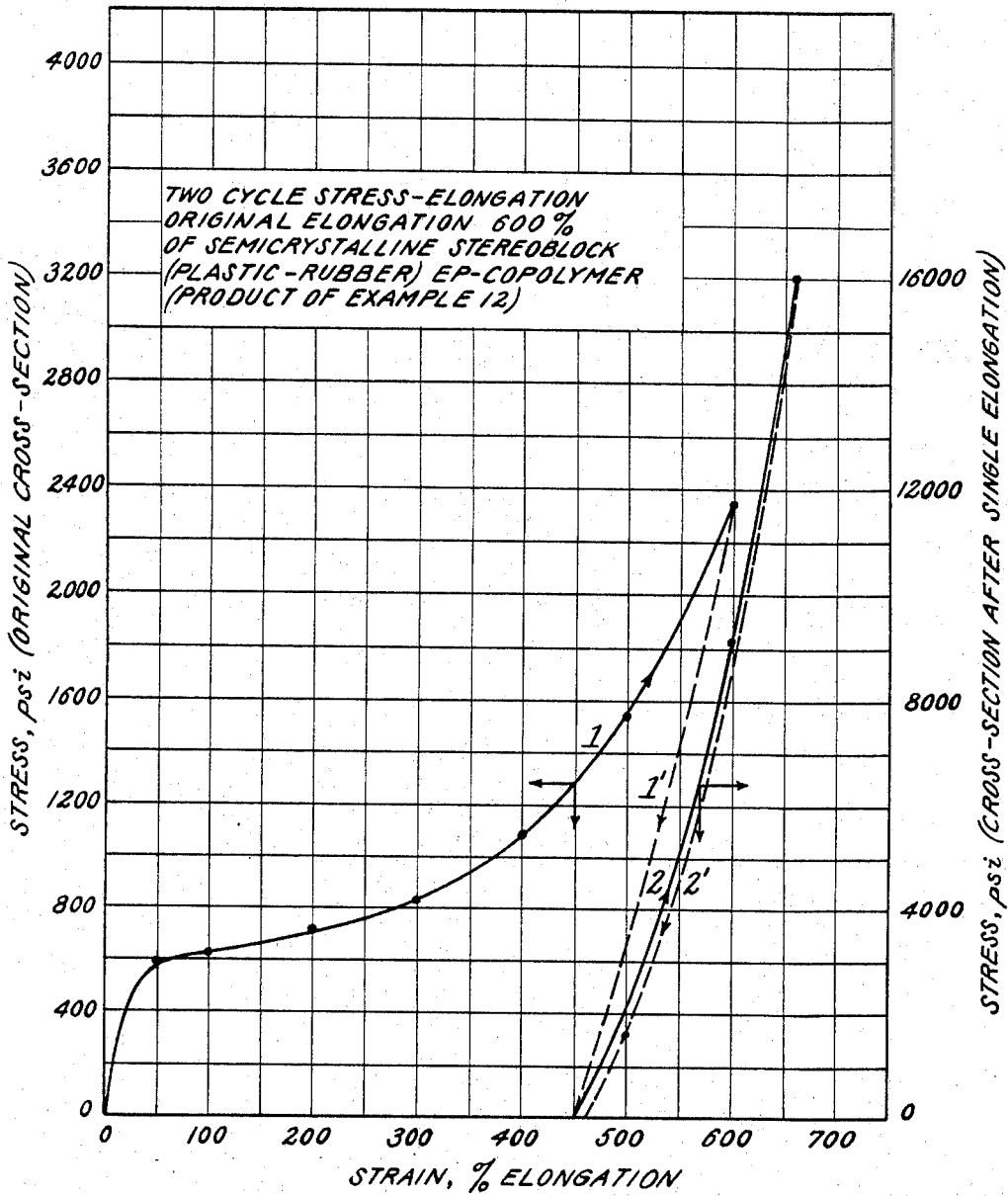

3,378,606
SEMICRYSTALLINE STEREOBLOCK
COPOLYMERS
Emmanuel G. Kontos, New Haven, Conn., assignor to
Uniroyal, Inc., a corporation of New Jersey
Filed Sept. 10, 1962, Ser. No. 222,547
19 Claims. (Cl. 260—878)

This invention relates to novel stereoblock copolymers of 1-olefins and to the methods for preparing same. More particularly, it relates to semicrystalline stereoblock copolymers of 1-olefins possessing plastic-rubber properties.

The term "stereoblock copolymer," as used herein, characterizes those copolymers in which the polymerized monomers are arranged along the polymeric chain with a certain spatial (stereo) arrangement and in such an order that alternating blocks of (1) copolymers and homopolymers, (2) dissimilar copolymers, or (3) dissimilar homopolymers are obtained. The term "1-olefins," as used herein, is meant to include ethylene and higher 1-alkenes, commonly known as alpha-olefins, having a double bond situated between the first and second carbon atoms of the carbon chain.

It has been known heretofore that 1-olefins, having the general formula $CH_2=CHR$, wherein R is a hydrogen atom or an alkyl group, may be homopolymerized and copolymerized by means of ionic coordination catalysts, sometimes called Ziegler-type catalysts, which are obtained by reacting a transition metal compound with an organometallic compound.

Structural investigations of homopolymers of alpha-olefins, represented by the formula

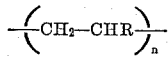

wherein R is an alkyl group and $n$ is more than 100, obtained by the use of stereospecific and non-stereospecific Ziegler-type catalysts, have shown that, depending on the specific spatial orientation of the R substituent, it is possible to distinguish isotatic, syndiotactic and atactic homopolymers. Isotactic and syndiotactic homopolymers of alpha-olefins usually possess well-defined crystalline structures and are plastic compounds. Atactic homopolymers of alpha-olefins do not form definite crystalline structures and are generally amorphous, but, in some instances, they have the ability to crystallize upon stretching in the same manner that natural rubber crystallizes upon stretching. In the prior art, stereospecific Ziegler-type catalysts have been used successfully to produce crystalline, plastic-like isotactic and syndiotactac homopolymers, and non-stereospecific Ziegler-type catalysts have been used successfully to produce non-crystalline (amorphous) atactic homopolymers.

It is also known that 1-olefins may be copolymerized with other 1-olefins, using catalysts of the Ziegler-type, to produce copolymers having a random distribution of the monomeric units along the polymeric backbone. These random copolymers are either non-crystalline (amorphous), rubber-like products or crystalline, plastic-like products depending on the specific Ziegler-type catalyst and polymerization process used. Thus, random copolymers prepared with stereospecific Ziegler-type catalysts are crystalline products, while non-stereospecific Ziegler-type catalysts are used to prepare non-crystalline copolymers. Crystalline and non-crystalline (amorphous) copolymers were the only types of 1-olefin copolymers known prior to my inventions in this field. There is no prior art teaching of my technique for obtaining the copolymers of this invention by making appropriate variations in the monomeric feed stocks.

In Belgian Patent No. 577,819, crystalline copolymers were stereoblocks and a method for their preparation by the use of stereospecific Ziegler-type catalysts, namely alpha-$TiCl_3$ and $Al(C_2H_5)_3$, are disclosed. These patentees achieved the formation of the desired crystalline copolymers by the interrupted addition of different monomers, but made no teaching suggestive of the instant invention.

In a copending application of the inventor, Ser. No. 63,050, filed Oct. 17, 1960, crystallizable stereoblock rubbery copolymers of 1-olefins and methods for their preparation by the use of essentially non-stereospecific Ziegler-type catalysts for 1-olefin polymerization are disclosed.

The molecular architecture of the polymer backbone (i.e., the manner in which the monomer units are connected in a polymer chain and their spatial isomery), the inter-action between the polymer chains plus their arrangement and relationship to each other in space will determine the physical properties of a given polymer and the class in which it will belong, that is (1) non-crystalline, (2) crystallizable, (3) semicrystalline, or (4) crystalline.

The term "crystalline," as used herein, characterizes those polymers which possess high degrees of inter- and intra-molecular order, and which have a crystallinity content above 40 percent, as determined by X-ray analysis. The term "semicrystalline," as used herein, characterizes those polymers which possess a lesser degree of inter- and intra-molecular order than in the crystalline polymers, and which have a crystallinity content ranging from about 4 to about 40 percent, as determined by X-ray analysis. The term "crystallizable," as used herein, describes those polymers which are mainly amorphous in the undeformed state, but which, upon being stretched, are characterized by the orientation of the polymeric chains occurring with resulting crystallization. The term "non-crystalline," or amorphous, as used herein, characterizes those polymers which do not have any crystallinity, determinable by X-ray analysis, in either the undeformed or elongated states.

No known attempts, however, have been made in the prior art to prepare polymeric materials, with the use of non-stereospecific Ziegler-type catalysts, in which the arrangement of alternating and successive polymeric blocks along the polymeric backbone is such that semicrystalline stereoblock copolymers having plastic-rubber properties are obtained.

Therefore, it is an object of this invention to produce semicrystalline stereoblock copolymers having plastic-rubber properties.

It is further object of this invention to prepare semicrystalline stereoblock copolymers having plastic-rubber properties and comprising alternating blocks of hereinafter described copolymers and/or homopolymers.

Various other objects, advantages and features of the invention will become apparent to one skilled in the art upon consideration of the accompanying disclosure.

The term "plastic-rubber," as used herein, characterizes those stereoblock copolymers which possess properties of a plastic-like material in the unoriented (unstretched) state and elastomeric properties in the oriented (stretched) state. They represent a new and important type of polymeric material. Their stress-strain behavior is characterized by a low initial modulus of elasticity, especially as compared to that of crystalline polyethylene and polypropylene, but not as low as compared to that of amorphous ethylene-propylene copolymers. The stress, moreover, increases with an increase in elongation. This is not the case with crystalline polyethylene and polypropylene and amorphous ethylene-propylene copolymers, which tend to become plastically deformed under a more or less constant load. Thus, the term "plastic-rubber" is inapplicable to other than semicrystalline stereoblock copolymers.

Another unique feature of the "plastic-rubber" polymers is their similar behavior to vulcanized elastomers in the oriented state. This elastomeric behavior becomes evident upon examination of the stress-strain curve of "plastic-rubber" stereoblock copolymers which have been previously stretched to 500–700% elongation. Such polymers have a high breaking load and they exhibit an almost complete recovery at elongation up to the rupture point, which behavior is very much like that of typical vulcanized elastomers.

It is possible, therefore, through the semicrystalline stereoblock copolymers of this invention, to prepare "plastic-rubber" products having a continuous variation of mechanical properties by controlling the combination of polymeric block segments along the polymeric chain and the degree of crystallinity of the final product. As the crystallinity increases from 4 to 40 percent, there is generally an increase in the initial tensile modulus of elasticity, in the rupture load, in the residual deformation after rupture and in the surface hardness, and a reduction in the reversible elastic elongation.

Some of the unique features of the products of this invention are depicted in the stress-strain curves of FIGURES 1 and 2. In FIGURE 1, the stress-elongation behavior of the copolymer of Example 12 is shown, "EP" referring to the fact that this is an ethylene-propylene copolymer. The behavior of this copolymer is characterized by a considerable increase in the stress with increase in elongation and a relatively low initial modulus of elasticity. The considerably different stress-elongation characteristics of two elastomeric copolymers and a crystalline homopolymer are also shown. The latter product is said, according to Belgian Patent No. 577,819, to have similarly in this test to the behavior of the crystalline stereoblock copolymers of this Belgian patent. The curve identified as representing the behavior of the crystallizable stereoblock copolymer was obtained in testing a product of the invention claimed in my copending application, Ser. No. 63,050, filed Oct. 17, 1960.

FIGURE 2 illustrates one of the unique properties of the copolymers of this invention. As in FIGURE 1, this curve was obtained in testing the copolymer of Example 12. The initial elongation up to 600 percent elongation is shown in curve 1, with the recovery (or retraction) being shown in curve 1'. Curves 2 and 2' show a unique feature of the "plastic-rubber" copolymers. A complete recovery of the sample stretched for the second time is observed, and a very high rupture load (16,000 p.s.i.) is indicated. This is the typical behavior of a vulcanized elastomer, but it must be emphasized that the test results reported in FIGURE 2 were obtained on the unvulcanized product of Example 12. Thus, the first cycle (curves 1 and 1') represents plastic deformation, and the second cycle (curves 2 and 2') represents elastic deformation.

The novel semicrystalline stereoblock copolymers of this invention may be illustrated by the following formulas which represent the structures of the polymeric chains:

(I)
$$[A_{(a_1, b_1, etc.)}]_{X_1}-[B]_{Y_1}-[A_{(a_2, b_2 etc.)}]_{X_2}-[B]_{Y_2}-etc.$$

(II)
$$[A_{(a_1, b_1 etc.)}]_{X_1}-[A_{(a_2, b_2, etc.)}]_{X_2}-[A_{(a_3, b_3, etc.)}]_{X_3}-etc.$$

(III)
$$[B]_{Y_1}-[B]_{Y_2}-[B]_{Y_3}-etc.$$

A—is a copolymer block (i.e., a segment of the polymeric chain) derived from two or more dissimilar 1-olefins, represented by small letters $a, b, \ldots$ etc.;

$a_1, b_1, \ldots a_2, b_2, \ldots$ etc.—each represents the number of molecules of each 1-olefin monomer $a, b, \ldots$ etc. making up copolymer block No. 1, block No. 2, etc., respectively;

$X_1, X_2, \ldots$ etc.—represents the total number of molecules of 1-olefin monomers making up copolymer block No. 1, block No. 2, etc., respectively;

B—is a homopolymer block of a 1-olefin;

$Y_1, Y_2, \ldots$ etc.—represents the total number of molecules of 1-olefin monomers making up homopolymer block No. 1, block No. 2, etc., respectively.

Based on crystallinity content, the selection of the alternating and successive copolymer and/or homopolymer block segments that may be used in making up the polymeric chains of this invention, as represented by Formulas I, II and III above, must be such that the resulting stereoblock copolymer is semicrystalline in nature, that is, its crystallinity content ranges from about 4 to about 40 percent, as determined by X-ray analysis. With this principle in mind, the following table depicts the possible types of copolymer and/or homopolymer block segments that may be combined in accordance with this invention.

FORMULA I

| Block Segment "B" | Block Segment "A" |
|---|---|
| Crystalline homopolymer alternating with | Semicrystalline copolymer. Crystallizable copolymer. Amorphous copolymer. |
| Semicrystalline homopolymer alternating with | Crystalline copolymer. Semicrystalline copolymer. Crystallizable copolymer. Amorphous copolymer. |
| Crystallizable homopolymer alternating with | Crystalline copolymer. Semicrystalline copolymer. |
| Amorphous homopolymer alternating with | Crystalline copolymer. |

FORMULA II

| Block Semgent "A" | Block Segment "A" |
|---|---|
| Crystalline copolymer alternating with | Semicrystalline copolymer. Crystallizable copolymer. Amorphous copolymer. |
| Semicrystalline copolymer alternating with | Semicrystalline copolymer. Crystallizable copolymer. Amorphous copolymer. |

FORMULA III

| Block Segment "B" | Block Segment "B" |
|---|---|
| Crystalline homopolymer alternating with | Semicrystalline homopolymer. Crystallizable homopolymer. Amorphous homopolymer. |
| Semicrystalline homopolymer alternating with | Semicrystalline homopolymer. Crystallizable homopolymer. Amorphous homopolymer. |

According to this invention, the polymerization of 1-olefins to form semicrystalline stereoblock copolymers of the above structures produces polymeric products with tailor-made plastic-rubber properties. Upon the particular monomers used, the particular molar composition of the copolymer blocks A, the length of the blocks A and B, and the nonstereospecific catalyst used depend the physical and mechanical properties of the stereoblock copolymeric products that are obtained, as is more fully explained below. In other words, the production of the desired copolymers of this invention is achieved by sequentially changing the identity and/or molar ratios of the monomers being charged to the polymerization zone as the polymerization reaction proceeds. This is the optimum method, without changing the catalyst composition or reaction conditions, of causing the formation of the different, successive block segments which are the key to the advance over the prior art represented by this invention.

Specific 1-olefins which are useful in forming the homopolymer blocks B include (1) straight-chain 1-olefins, such as ethylene, propylene, butene-1, pentene-1, dodecene-1, etc., and (2) branched-chain 1-olefins having one or more alkyl substituent branched on the chain, such as 3 - methyl - butene - 1, 4 - methyl-pentene-1, 4 - methyl-hexene-1, 4,5-dimethyl-hexene-1, 4-methyl-5-ethyl-hexene-1, 3-methyl-6-propyl-heptene-1, etc. The preferred monomers are straight-chain or branched-chain 1-olefins containing a maximum of 12 carbon atoms.

The copolymer blocks A are obtained by polymerizing at least two dissimilar 1-olefin monomers. Any of the 1-olefin monomers used in forming the homopolymer blocks B may be used in forming the copolymer blocks A. The preferred monomers for use in the copolymer blocks A are also straight-chain or branched chain 1-olefins containing a maximum of 12 carbon atoms. It is not necessary to use the same 1-olefin that is used for the homopolymer blocks B in making the copolymer blocks A. Thus, the block A may be a copolymer of two or more dissimilar 1-olefins, none of which need be the 1-olefin used for the homopolymer block B.

In the stereoblock copolymers represented by the structure shown in Formula I above, the homopolymer blocks B may consist of (1) the same 1-olefin or (2) dissimilar 1-olefins along the same stereoblock polymeric chain, whereas, in Formula III, at least two dissimilar 1-olefins must necessarily be used in forming the alternating homopolymer blocks B. The copolymer blocks A of Formula I may consist of (1) the same 1-olefin monomers in the same molar ratios, or (2) the same monomers in different molar ratios, or (3) dissimilar monomers completely, throughout the chain. In Formula II, dissimilar monomers or different molar ratios of the same monomers must be used in each alternate block. If the same monomers are used and the percent molar compositions of the monomers making up the copolymer blocks A in Formula II are substantially the same, the result will be a copolymer with randomly distributed monomers along the polymeric chain and without the semicrystalline characteristic which is necessary for this invention.

The length of the different copolymer blocks A and homopolymer blocks B may be either equal (i.e., $X_1=X_2=X_3$ ... etc., and $Y_1=Y_2=Y_3$ ... etc.) or unequal (i.e., $X_1 \neq X_2 \neq X_3$ ... etc., and $Y_1 \neq Y_2 \neq Y_3$ ... etc.). Further, the minimum total number of alternating blocks in any of the structures, represented above by Formulas I to III, has been found to be two for the purposes of this invention. It is preferred, however, that the total number of alternating blocks be from 5 to 11. There is no critical limit, save for practicality, as to the maximum number of blocks that might be used for any of the three types of structures.

It is preferred, but not necessary, to limit the composition of the copolymer block A in structures represented by Formula I to the participation of two 1-olefins and to limit the preparation of the homopolymer block B in Formula I to the use of one of the two monomers used in the preparation of the copolymer block A.

Several methods of block polymerization may be used to obtain the novel semicrystalline stereoblock copolymers of this invention. For example, in the preparation of the semicrystalline stereoblock copolymers represented by Formula I above, a 1-olefin may first be polymerized to form a homopolymer block B, a mixture of at least two 1-olefin monomers may then be copolymerized to form a copolymer block A and, thereafter, alternating and successive homopolymer and copolymer blocks may be added to the polymeric chain. In preparing those semicrystalline stereoblock copolymers represented by Formula II, at least two 1-olefin monomers are copolymerized to form the first copolymer block A and, thereafter, different 1-olefin monomers are copolymerized to form the succeeding copolymer blocks; or, alternatively, the same monomers as were initially used to form the first copolymer block may again be used in forming subsequent copolymer blocks, provided, however, that the molar ratio of the monomers in each successive block is different than in the block preceding it. As to the semicrystalline stereoblock copolymers represented by Formula III, a 1-olefin is polymerized to form the first homopolymer block B, a different 1-olefin is then polymerized to form a second homopolymer block, and, thereafter, alternating blocks of successively different homopolymers may be added to the polymeric chain.

As a guide to indicating positively how to produce the copolymers of this invention, the following information on the composition of the several types of blocks is presented. These stated compositions are preferred but are not intended to be limiting, since other combinations of reactant monomers and reaction conditions than those specified below and in the examples will also yield the desired products. Thus, in forming the semicrystalline stereoblock copolymers of this invention, the following block compositions have been found to be optimum. The crystalline homopolymer blocks desirably each contains from about 1000 to about 2000 molecules of ethylene; the semicrystalline homopolymer blocks desirably each contains from about 200 to about 1000 molecules of ethylene or from about 1000 to about 2000 molecules of a 1-olefin having more than 2 carbon atoms per molecule; the crystallizable homopolymer blocks desirably each contains from about 20 to about 200 molecules of ethylene or from about 200 to about 1000 molecules of a 1-olefin having more than 2 carbon atoms per molecule; the amorphous homopolymer blocks desirably each contains from about 20 to about 200 molecules of a 1-olefin having more than 4 carbon atoms per molecule; the crystalline copolymer blocks desirably each contains from about 1000 to about 2000 monomer molecules consisting of ethylene and at least 1 dissimilar 1-olefin in a molar ratio selected from the following ethylene: dissimilar 1-olefin range: 99.8:0.2 to 98:2; the semicrystalline copolymer blocks desirably each contains from about 500 to about 1000 monomer molecules consisting of ethylene and at least 1 dissimilar 1-olefin in a molar ratio selected from the following ethylene:dissimilar 1-olefin ranges: 0.2:99.8 to 2:98 and 98:2 to 95:5; the crystallizable copolymer blocks desirably each contains from about 200 to about 500 monomer molecules consisting of a 2 dissimilar 1-olefins in a molar ratio selected from the ranges: 5:95 to 20:80 and 95:5 to 80:20; and the amorphous copolymer blocks desirably each contains from about 100 to about 2000 monomer molecules consisting of 2 dissimilar 1-olefins in a molar ratio selected from the range 20:80 to 80:20.

Block polymerization of the type described herein is based on the discovery that complexes between the ionic-coordination catalysts of the type described above and the growing polymer chain remain active for a significant period of time, i.e., these catalysts have the ability to maintain the growing polymer chain in a polymerizable condition for a considerable period of time. Since the ionic-coordination type catalysts maintain the growing molecule in a polymerization condition, this permits separate introduction of various polymerizable monomers and the sequential formation of blocks of homopolymers and/or copolymers, as desired.

In conducting polymerizations by this method, it is possible to remove all unreacted monomers in the polymerization system before polymerization of an additional monomer or monomers either by a vacuum technique or by purging the polymerization system with an inert gas such as nitrogen. By these techniques, it is possible to obtain distinct blocks which are uncontaminated by the monomer used in forming a previous block. However, in most cases it is not necessary to obtain blocks of this purity, and it is sufficient to add the new monomer or monomers without removal of any unreacted monomers used in the preparation of a previous block. Additionally, if a common 1-olefin is used in forming both the homopolymer block and the copolymer blocks, it is usually not necessary to remove any unreacted common 1-olefin from the polymerization system prior to the formation of the next alternating block. In such cases, after polymerization of one monomer to form the homopolymer block B, the second polymerizable monomer may simply be added and the common 1-olefin monomer may be continuously introduced into the polymerization system.

The non-stereospecific Ziegler-type catalysts which may be used in the preparation of the semicrystalline stereo-block copolymers of this invention include the ionic-coordination type catalysts containing a transition metal and organo-metallic bonds, which are capable of polymerizing 1-olefins to form mainly atactic polymers. This class of catalysts is well-known in the art and includes mixtures of vanadium oxytrihalide with either aluminum trialkyl, alkyl aluminum dihalides or dialkyl aluminum halides, or mixtures, particularly of the latter two; mixtures of titanium tetrahalide with lithium aluminum tetraalkyl; mixtures of titanium tetrahalide with both lithium alkyl and aluminum trialkyl; and mixtures of titanium tetrahalide with either aluminum trialkyl, alkyl aluminum dihalide, dialkyl aluminum halide or mixtures of the latter two compounds. Specific examples of catalysts which are suitable for this invention includes mixtures of vanadium oxytrichloride with the following: triethyl aluminum, tripropyl aluminum, tributyl aluminum, triisobutyl aluminum, triphenyl aluminum, trihexyl aluminum, triheptyl aluminum, tridodecyl aluminum, ethyl aluminum dichloride, propyl aluminum dichloride, butyl aluminum dichloride, phenyl aluminum dichloride, diethyl aluminum chloride, dipropyl aluminum chloride or dibutyl aluminum chloride, mixtures of diethyl aluminum chloride and ethyl aluminum dichloride; mixtures of titanium tetrachloride with an aluminum compound from the above listing; and mixtures of titanium tetrachloride with lithium aluminum tetraethyl, lithium aluminum tetrapropyl, lithium aluminum tetrabutyl or lithium butyl-aluminum triisobutyl.

The minimum concentration of the catalyst in the polymerization system should be about 0.0001 to about 0.1 mole of catalyst per liter of solvent. However, it is preferred to use from about 0.0005 to about 0.02 mole per liter of solvent. The catalyst concentration will vary with the specific catalyst and the particular monomers used in the polymerization reaction and, in some cases, amounts of catalysts above and below the indicated ranges may be desirable. The minimum concentration of catalyst in the solvent is critical; below this concentration, regardless of the concentration of the reactants, no polymerization occurs. Above the specified catalyst concentrations, the amount of polymer produced prior to catalyst exhaustion is not increased significantly. It is to be noted that copolymers with higher molecular weights are formed at the lower catalyst concentrations. As an indication of the results which can be attained, some 200 to 2000 gms. of the copolymer of this invention can be produced per gram of catalyst utilized.

The polymerization reaction is usually carried out in an inert hydrocarbon solvent medium. The particular solvent used in some cases is selected on the basis of its boiling point; for example, where it is necessary to employ a high temperature in the polymerization reaction, it is desirable to have a solvent with a boiling point above the temperature of the polymerization reaction. Generally, it has been found that such solvents as benzene, toluene, xylene, hexane, heptane, octane and other hydrocarbon solvents may be used in the reaction.

The temperature of the polymerization reaction will depend on the particular monomers that are being polymerized, the rates of reaction of these monomers, the boiling point of the solvent system, and the desired length of the blocks in the stereoblock copolymer. Due to the fact that the rates of reaction of different polymerizable monomers vary with the temperature, the temperature of polymerization will have an effect on the size of the blocks. In each case, it is desirable to predetermine the exact temperature at which several monomers can be polymerized to give a particular type of stereoblock copolymer. Generally, however, it has been found that stereoblock copolymers can be produced in the temperature range of from about 0° C. to about 100° C. It is preferred to carry out the polymerization in the temperature range of from about 20° C. to about 35° C.

The polymerization reaction may be carried out at various pressures although, in most cases, it is sufficient to polymerize the monomers at atmospheric pressure. However, the pressure limits for the polymerization procedure can vary from almost zero up to 100 p.s.i.g. (i.e., pressure above atmospheric pressure), and, in some cases, it may be desirable to use either elevated or reduced pressures in order to decrease or increase the reaction time so as to produce particular types of stereoblock polymers.

Extraction studies in boiling n-heptane, X-ray diffraction patterns and the stress-strain characteristics of the semicrystalline stereoblock copolymers, obtained by employing the above-mentioned polymerization techniques, prove that these are true copolymers and that their properties are entirely different from those of copolymers having a random distribution of monomers along the polymeric chain, homopolymers of 1-olefins, and physical mixtures of such homopolymers.

When a physical mixture of polyethylene and polypropylene homopolymers, consisting, for example, of 50 parts of polyethylene and 50 parts of polypropylene by weight, is extracted in boiling n-heptane for 48 hours, the extractable portion is 44 percent, representing 1 percent and 43 percent extractable portions of polyethylene and polypropylene, respectively. In the semi-crystalline stereoblock copolymers of this invention, the extractable portion percentage is considerably higher. In the following Example #3, the extractable portion in boiling n-heptane was 73 percent. In the other examples, this value ranged from about 65 to about 80 percent. Data published by the patentees of Belgian Patent No. 577,819 regarding the crystalline copolymers of that patent reveal that the extractable portion in boiling n-heptane (48 hours) was 18–20 percent. This indicates a further significant distinction between the copolymers of that patent and the copolymers of this invention. As another point of reference relative to the uniqueness of the copolymers of this invention, the extractable portion in boiling n-heptane (48 hours) of the crystallizable copolymers of my copending application (Ser. No. 63,050) is greater than 90 percent.

Another important difference between the stereoblock copolymers of the present invention and a physical mixture of homopolymers is shown by the percent composition of the extracts in boiling n-heptane and the extraction residues. In the case of the semicrystalline stereoblock copolymers of this invention, the percent composition of the extract and the extraction residue is almost the same as that of the original composition of the copolymer under extraction, whereas, with a 50/50 by weight physical mixture of polyethylene and polypropylene homopolymers, the extracts contained more than 95 percent polypropylene and the residues contained more than 85 percent polyethylene. The results of these extraction studies demonstrate that the stereoblock copolymers of this invention are true copolymers rather than physical mixtures of homopolymers.

On the basis of the physical and mechanical properties of the semicrystalline stereoblock copolymers of this invention, numerous useful applications are obvious. For example, they can be used as thermoplastic resins for the production of mechanical goods by known methods of molding, injection, extrusion, etc. Another very important application is in the adhesion of two articles coated with or consisting of polymeric products produced from the same monomers used in the preparation of the stereoblock copolymer.

Another use of the semicrystalline copolymers of this invention consists in the production of vulcanizates, which may be reinforced. These stereoblock copolymers can be compounded and vulcanized similarly to other copolymers obtained from 1-olefins. They can be vulcanized with conventional vulcanizing ingredients and can be compounded with fillers, pigments and various plasticizers.

Example 1

This example illustrates a method of preparing a semicrystalline stereoblock copolymer of alternating crystalline polyethylene homopolymer blocks (E) with amorphous ethylene-propylene copolymer blocks (E–P). A catalyst consisting of 0.0144 mole of LiAl(n-heptyl)$_4$, dissolved in approximately 23 ml. of toluene, and 0.0144 mole of TiCl$_4$ was added to 1800 ml. of dried and purified heptane in a three-neck flask equipped with a thermometer and stirrer under an atmosphere of purified nitrogen. Polymerization was carried out at a temperature of 25°–35° C. by introducing the monomers at a feed rate of 750 ml./min. into the flask below the surface of the stirred catalyst solution. Formation of the alternating building blocks was carried out in the following order, which is tabulated below in Table A.

(1) Polymerization of ethylene for 4 minutes.
(2) Copolymerization of a 50/50 molar ethylene-propylene feed mixture for 2 minutes.
(3) Propylene feed stopped; polymerization of ethylene for 8 minutes.
(4) Copolymerization of a 50/50 molar ethylene-propylene feed mixture for 2 minutes.
(5) Propylene feed stopped; polymerization of ethylene for 12 minutes.
(6) Copolymerization of a 50/50 molar ethylene-propylene feed mixture for 2 minutes.
(7) Propylene feed stopped; polymerization of ethylene for 40 minutes.

TABLE A

| Block Sequence | Crystalline Homopolymer Block | Amorphous Copolymer Block | Mole percent of $C_2H_4$ in Feed | Feed Rate of Monomers (ml./min.) (E) (P) | Feed Time (mins.) |
|---|---|---|---|---|---|
| 1 | E | | 100 | 750 | 4 |
| 2 | | E-P | 50 | 750—750 | 2 |
| 3 | E | | 100 | 750 | 8 |
| 4 | | E-P | 50 | 750—750 | 2 |
| 5 | E | | 100 | 750 | 12 |
| 6 | | E-P | 50 | 750—750 | 2 |
| 7 | E | | 100 | 750 | 40 |

After the above polymerization sequence, a very viscous mixture was obtained from which the reaction product was isolated by pouring the mixture into an equal volume of a methanol-isopropanol mixture (50–50, by weight) containing a small amount (0.5 percent by weight of copolymer) of phenyl-beta-naphthylamine as antioxidant. A solid precipitate was obtained which was washed with an additional amount of the same 50–50 methanol-isopropanol mixture. After allowing the precipitate to stand at room temperature for 24 hours, 110 gms. of a semicrystalline stereoblock copolymer was obtained. This copolymer has the Formula I type of structure. Infrared spectrographic analysis, utilizing the characteristic bands of absorption at 7.25$\mu$ and 13.9$\mu$, gave an 88/12 weight ratio of ethylene/propylene in the copolymer. Intrinsic viscosity in tetralin at 135° C. was 5.5. X-ray diffraction analysis showed 40 percent crystallinity. The tensile strength of the unvulcanized copolymer at the rupture point was 2390 p.s.i., and the elongation at the same point was 570 percent. The above data are also tabulated below in Table K.

Example 2

This example illustrates a semicrystalline stereoblock copolymer with alternating crystallizable and semicrystalline ethylene-propylene copolymer blocks. The same polymerization conditions were employed as described in Example 1 and the polymerization steps were carried out in the order shown in Table B.

TABLE B

| Block Sequence | Crystallizable Copolymer Block | Semicrystalline Copolymer Block | E-P Molar Ratio of Feed | Feed Rate of Monomers (ml./min.) (E) (P) | Feed Time (min.) |
|---|---|---|---|---|---|
| 1 | E-P | | 10-90 | 150—1,350 | 4 |
| 2 | | E-P | 1-99 | 15—1,485 | 12 |
| 3 | E-P | | 10-90 | 150—1,350 | 4 |
| 4 | | E-P | 1-99 | 15—1,485 | 8 |
| 5 | E-P | | 10-90 | 150—1,350 | 40 |
| 6 | | E-P | 1-99 | 15—1,485 | 12 |

Eighty-six grams of stereoblock copolymer were isolated according to the same procedure as in Example 1. This copolymer has the Formula II type of structure. The physical properties of this copolymer are tabulated below in Table K.

Example 3

This example illustrates a semicrystalline stereoblock copolymer of alternating semicrystalline homopolymer blocks of polyethylene and crystallizable homopolymer blocks of polypropylene. The same polymerization conditions were employed as in Example 1, except that a vacuum of 23 in Hg was used for 4 minutes after each homopolymerization step for the removal of unreacted monomers from the polymerization system.

Ethylene gas was introduced at a feed rate of 1500 ml./min. for 5 minutes into the flask below the surface of the stirred catalytic solution to form a homopolymer block of polyethylene. This was followed by 4 minutes of vacuum. Propylene gas was then similarly subjected to homopolymerization for 5 minutes, followed by 4 minutes of vacuum. This alternate formation of polyethylene and polypropylene block segments was repeated until six blocks of polyethylene and five blocks of polypropylene had been formed.

Sixty grams of a semicrystalline stereoblock copolymer were isolated according to the method described in Example 1. The structure of this copolymer belongs to the class represented by Formula III. The physical properties of this copolymer are tabulated below in Table K.

Example 4

This example illustrates a semicrystalline stereoblock copolymer of alternating crystallizable homopolymer blocks of polybutene-1 and crystalline homopolymer blocks of polyethylene. The same polymerization conditions were employed as in Example 1, except that a 50/50 mixture of Al(i-Butyl)$_3$ and Li(Butyl) were used as cocatalyst instead of the LiAl($C_7H_{15}$)$_4$ that was used in Example 1. The polymerization steps were carried out at 30–35° C. in the order shown in Table C.

TABLE C

| Block Sequence | Crystallizable Homopolymer Blocks | Crystalline Homopolymer Blocks | Feed Rate of Monomers (ml./min.) | Feed Time (min.) |
|---|---|---|---|---|
| 1 | | E | 1,500 | 10 |
| 2 | Butene-1 | | 1,500 | 8 |
| 3 | | E | 1,500 | 10 |
| 4 | Butene-1 | | 1,500 | 8 |
| 5 | | E | 1,500 | 10 |
| 6 | Butene-1 | | 1,500 | 8 |
| 7 | | E | 1,500 | 10 |

One hundred grams of semicrystalline stereoblock copolymer were isolated according to the same procedure as in Example 1. This copolymer has the Formula III type of structure. The physical properties of this copolymer are tabulated below in Table K.

Example 5

This example illustrates a semicrystalline stereoblock copolymer of alternating crystallizable ethylene-propylene copolymer blocks (E-P) and semicrystalline homopolymer blocks of polyethylene (E). A catalyst consisting of 0.004 mole of $VOCl_3$ and 0.06 mole of $(C_2H_5)AlCl_2$ was added to 2000 ml. of dried and purified Skelly-B solvent (a mixture of alkanes with a boiling range of 60°–70° C. marketed by the Skelly Oil Co.). The polymerization steps were carried out under a nitrogen atmosphere in the order shown in Table D.

TABLE D

| Block Sequence | Crystallizable Copolymer Blocks | Semicrystalline Homopolymer Blocks | Mole Percent of $C_2H_4$ in Feed | Feed Rate of Monomers (ml./min.) | | Feed Time (min.) |
|---|---|---|---|---|---|---|
| | | | | (E) | (P) | |
| 1 | E-P | | 90 | 1,350 | 150 | 4 |
| 2 | | E | 100 | 1,500 | | 6 |
| 3 | E-P | | 90 | 1,350 | 150 | 4 |
| 4 | | E | 100 | 1,500 | | 6 |
| 5 | E-P | | 90 | 1,350 | 150 | 4 |
| 6 | | E | 100 | 1,500 | | 6 |

Sixty-three grams of semicrystalline stereoblock copolymer were isolated according to the method described in Example 1. This copolymer has the Formula I type of structure. The physical properties of this copolymer are tabulated below in Table K.

Example 6

This example illustrates a semicrystalline stereoblock copolymer with alternating semicrystalline ethylene-butene-1 copolymer blocks (E-B), crystalline polyethylene blocks (E), and semicrystalline ethylene-propylene copolymer blocks (E-P).

The same polymerization conditions and catalysts were employed as in Example 5 and the polymerization steps were carried out in the order shown in Table E.

TABLE E

| Block Sequence | Semicrystalline Copolymer Blocks | Crystalline Homopolymer Blocks | Mole percent of $C_2H_4$ in Feed | Feed Rate of Monomers (ml./min.) | | Feed Time (min.) |
|---|---|---|---|---|---|---|
| | | | | (E) | (B) or (P) | |
| 1 | E-B | | 96 | 60 | 1,440 | 5 |
| 2 | | E | 100 | 1,500 | | 10 |
| 3 | E-B | | 96 | 60 | 1,440 | 5 |
| 4 | | E | 100 | 1,500 | | 10 |
| 5 | E-P | | 96 | 60 | 1,440 | 5 |
| 6 | | E | 100 | 1,500 | | 12 |
| 7 | E-P | | 96 | 60 | 1,400 | 5 |
| 8 | | E | 100 | 1,500 | | 6 |

Sixty five grams of semicrystalline stereoblock copolymer were isolated according to the same procedure as in Example 1. This copolymer has the Formula I type of structure, the copolymer blocks being formed by the copolymerization of three different alpha-olefin monomers, as, in this example, where ethylene-butene-1 were used for the first two copolymer blocks and ethylene-propylene for the last two. The physical properties of this copolymer are tabulated below in Table K.

Example 7

This example illustrates a semicrystalline stereoblock copolymer of alternate crystalline homopolymer blocks of polyethylene (E) and crystallizable ethylene-propylene copolymer blocks (E-P), where the first and last blocks are homopolymer blocks. A catalyst consisting of 0.008 mole of $VOCl_3$ and 0.02 mole of $Al(n-dodecyl)_3$ was added to 2000 ml. of dried and purified Skelly-B solvent in a three-neck flask equipped with a thermometer and stirrer under an atmosphere of purified nitrogen. Polymerization was carried out at a temperature of 20°–35° C. according to the order shown in Table F.

TABLE F

| Block Sequence | Crystalline Homopolymer Blocks | Crystallizable Copolymer Blocks | Mole Percent of $C_2H_4$ in Feed | Feed Rate of Monomers (ml./min.) | | Feed Time (min.) |
|---|---|---|---|---|---|---|
| | | | | (E) | (P) | |
| 1 | E | | 100 | 1,500 | | 10 |
| 2 | | E-P | 10 | 150 | 1,350 | 4 |
| 3 | E | | 100 | 1,500 | | 10 |
| 4 | | E-P | 10 | 150 | 1,350 | 4 |
| 5 | E | | 100 | 1,500 | | 12 |
| 6 | | E-P | 10 | 150 | 1,350 | 4 |
| 7 | E | | 100 | 1,500 | | 12 |

One hundred and ten grams of semicrystalline stereoblock copolymer were isolated according to the method described in Example 1. The structure of this copolymer is represented by Formula I. The physical properties of this copolymer are tabulated below in Table K.

Example 8

This example illustrates a method of preparing a semicrystalline stereoblock copolymer of polyethylene crystalline blocks (E) alternating with crystallizable ethylene-butene-1 copolymer blocks (E-B) and amorphous ethylene-propylene copolymer blocks (E-P). As in Example 6, the copolymer blocks are formed from different alpha-olefin monomers. The same polymerization conditions were employed as described in Example 4 and the polymerization steps were carried out in the order shown in Table G.

TABLE G

| Block Sequence | Crystalline Copolymer Blocks | Crystallizable Blocks | Amorphous Copolymer Blocks | Mole percent of $C_2H_4$ in Feed | Feed Rate of Monomers (ml./min.) | | Feed Time (min.) |
|---|---|---|---|---|---|---|---|
| | | | | | (E) | (B) or (P) | |
| 1 | E | | | 100 | 1,000 | | 6 |
| 2 | | E-B | | 10 | 150 | 1,350 | 5 |
| 3 | E | | | 100 | 1,000 | | 10 |
| 4 | | | E-P | 40 | 600 | 900 | 5 |
| 5 | E | | | 100 | 1,000 | | 10 |
| 6 | | E-B | | 10 | 150 | 1,350 | 5 |
| 7 | E | | | 100 | 1,000 | | 10 |
| 8 | | | E-P | 40 | 600 | 900 | 5 |
| 9 | E | | | 100 | 1,000 | | 10 |

Sixty-three grams of a semicrystalline stereoblock copolymer were isolated according to the procedure of Example 1. The structure of the copolymer is represented by Formula I. The physical properties of this copolymer are tabulated below in Table K.

Example 9

This example illustrates a method of preparing a semicrystalline stereoblock copolymer consisting of alternating amorphous ethylene-propylene-heptene-1 copolymer blocks (E-P-H) with semicrystalline ethylene-heptene-1 copolymer blocks (E-H). A catalyst consisting of 0.016 mole of $TiCl_4$, 0.016 mole of $Al(i-Butyl)_3$ and 0.016 mole of $Li(Butyl)$ was added to 2000 ml. of dried and purified Skelly-B solvent in a three-neck flask equipped with thermometer and stirrer under an atmosphere of purified nitrogen. Eighty-five ml. of heptene-1 were added to the polymerization flask containing the solvent and catalyst, and a 50/50 molar mixture of ethylene and propylene gas was introduced at a rate of 1500 ml./min. for 3 minutes to form the first copolymer block (E-P-H). The propylene feed was then stopped for 6 minutes during which time ethylene alone was introduced into the polymerization flask at a rate of 1500 ml./min. to form the second copolymer block (E-H). Thereafter, the propylene gas was fed into the flask for periods of 3 minutes and shut off for periods of 6 minutes; the ethylene flow continued during these periods at the respective rates stated above. The polymerization was carried out at a temperature of 28°–32° C. and the steps employed may be represented as follows:

(E-P-H)$_3'$ - (E-H)$_6'$ - (E-P-H)$_3'$ - (E-H)$_6'$ - (E-P-H)$_3'$ - (E-H)$_6'$

Seventy-five grams of semicrystalline stereoblock copolymer were isolated according to the procedure outlined in Example 1. This copolymer has the Formula II type of structure, and its physical properties are tabulated below in Table K.

Example 10

This example illustrates a semicrystalline stereoblock copolymer of alternating crystallizable homopolymer blocks of butene-1 (B) and semicrystalline ethylene-propylene copolymer blocks (E-P), in the production of which any unreacted and dissolved monomers were expelled from the system prior to the formation of each alternating block. The same catalytic system and conditions were employed as described in Example 9, with the only difference being that nitrogen gas was introduced to purge the reaction mixture at a rate of 2 liters/min. for a 5-minute period following the formation of each block segment. The polymerization steps were carried out according to the order shown in Table H.

TABLE H

| Block Sequence | Semicrystalline Copolymer Blocks | Crystallizable Homopolymer Blocks | Nitrogen Rate (ml./min.) | Mole Percent of C$_2$H$_4$ in Feed | Feed Rate of Monomers (ml./min.) (E) (P) | Feed Time (min.) |
|---|---|---|---|---|---|---|
| 1 | E-P | | | 95 | 1,425—75 | 4 |
| Purge | | | 2,000 | | | 5 |
| 2 | | B | | | 1,500(B) | 10 |
| Purge | | | 2,000 | | | 5 |
| 3 | E-P | | | 95 | 1,425—75 | 5 |
| Purge | | | 2,000 | | | 5 |
| 4 | | B | | | 1,500 | 10 |
| Purge | | | 2,000 | | | 5 |
| 5 | E-P | | | 95 | 1,425—75 | 5 |
| Purge | | | 2,000 | | | 5 |
| 6 | | B | | | 1,500 | 10 |

Sixty-four grams of semicrystalline stereoblock copolymer were isolated according to the method described in Example 1. The structure of this copolymer is represented by Formula I. The physical properties of this copolymer are tabulated below in Table K.

Example 11

This example illustrates a semicrystalline stereoblock copolymer of alternating crystallizable propylene-butene-1 copolymer blocks (P-B) and semicrystalline homopolymer blocks of polypropylene (P), prepared in the presence of hydrogen gas. The same catalytic system and polymerization conditions were employed as described in Example 4, the only difference being that, throughout the polymerization, a constant feed of about 30 ml./min. of hydrogen gas was introduced into the polymerization flask in order to reduce the average molecular weight of the copolymer. The polymerization temperature was 25°–35° C. and the polymerization steps were carried out in the order shown in Table I.

TABLE I

| Block Sequence | Crystallizable Copolymer Blocks | Semicrystalline Homopolymer Blocks | Mole percent of C$_3$H$_6$ in Feed | Feed Rate of Monomers (ml./min.) (P) (B) | Feed Time (min.) |
|---|---|---|---|---|---|
| 1 | P-B | | 90 | 1,350—150 | 6 |
| 2 | | P | 100 | 1,500 | 12 |
| 3 | P-B | | 90 | 1,350—150 | 6 |
| 4 | | P | 100 | 1,500 | 12 |
| 5 | P-B | | 90 | 1,350—150 | 6 |
| 6 | | P | 100 | 1,500 | 12 |
| 7 | P-B | | 90 | 1,350—150 | 6 |
| 8 | | P | 100 | 1,500 | 12 |

One hundred grams of semicrystalline stereoblock copolymer were isolated according to the method described in Example 1. The structure of this copolymer is represented by Formula I. The physical properties of this copolymer are tabulated below in Table K.

Example 12

This example illustrates the preparation of semicrystalline stereoblock copolymers on a relatively large scale. The semicrystalline stereoblock copolymer of this example is formed from alternating crystallizable ethylene-propylene copolymer blocks (E-P) and semicrystalline polyethylene blocks (E). To a 5 gallon reactor, containing 17 lbs. of dried and purified Skellysolve-B solvent, were added 0.112 mole of Al(i-Butyl)$_3$, dissolved in 5 lbs. of said solvent, and 0.112 mole of Li(Butyl), dissolved in 2 lbs. of said solvent. Ethylene and propylene monomers, in a molar ratio of 1:2, were introduced into the reactor until a pressure of 5 p.s.i.g. was reached. At this point, 0.122 mole of TiCl$_4$, dissolved in 5 lbs. of said solvent, was added to the reactor. Ethylene and propylene were thereafter introduced into the reactor according to the steps outlined in Table J. Polymerization was carried out at a temperature of 70°–120° F. and the pressure varied from 15 to 40 p.s.i.g.

TABLE J

| Block Sequence | Crystallizable Copolymer Block | Semicrystalline Homopolymer Block | Mole Percent of C$_2$H$_4$ in Feed | Feed Rate of Monomers (ml./min.) (E) (P) | Feed Time (min.) |
|---|---|---|---|---|---|
| 1 | E-P | | 74 | 2.7—0.8 | 5 |
| 2 | | E | 100 | 2.7 | 5 |
| 3 | E-P | | 75 | 2.7—0.8 | 5 |
| 4 | | E | 100 | 2.7 | 5 |
| 5 | E-P | | 75 | 2.0—0.6 | 8 |
| 6 | | E | 100 | 2.0 | 5 |
| 7 | E-P | | 75 | 2.0—0.6 | 10 |

After the above polymerization sequence, a very viscous reaction mixture was obtained from which the product was isolated by pouring the mixture into an equal volume of water containing a small amount of phenyl-beta-naphthylamine as antioxidant. A solid precipitate was obtained which was then washed with an additional amount of fresh water. After drying the precipitate at room temperature for 24 hours, 2.5 lbs. of semicrystalline stereoblock copolymer were obtained. The structure of this copolymer is represented by Formula I. The physical properties of this copolymer are tabulated below in Table K.

TABLE K

| Example No. | 1 | 2 | 3 | 4 | 5 | 6 |
|---|---|---|---|---|---|---|
| Structural type | I | II | III | III | I | I |
| Block segments | (E)(EP) | (EP)(EP) | (E)(P) | (E)(B) | (EP)(E) | (EB)(E)(EP) |
| Weight ratio of monomers in copolymer (I.R. analysis) | E/P=88/12 | E/P=4/96 | E/P=66/34 | E/B=74/26 | E/P=91/9 | E=97% |
| Intrinsic viscosity [N] in tetralin at 135° C | 5.5 | 3.5 | 4.1 | 5.2 | 5.7 | 7.4 |
| Percent Crystallinity (X-ray analysis) | 40 | 14 | 10 | 22 | 38 | 40 |
| Tensile strength at rupture (p.s.i.) | 2,930 | 1,000 | 1,980 | 1,900 | 1,320 | 1,950 |
| Percent Elongation at rupture | 570 | 720 | 670 | 600 | 50 | 400 |

| Example No. | 7 | 8 | 9 | 10 | 11 | 12 |
|---|---|---|---|---|---|---|
| Structural type | I | I | II | I | I | I |
| Block segments | (E)(EP) | (E)(EP)(EB) | (EPH)(EH) | (EP)(B) | (PB)(P) | (EP)(E) |
| Weight ratio of monomers in copolymer (I.R. analysis) | E/P=78/22 | E=61% | E=69% | E=66% | | E/P=73/27 |
| Intrinsic viscosity [N] in tetralin at 135° C | 5.4 | 3.6 | 3.1 | 3.9 | 1.9 | |
| Percent crystallinity (X-ray analysis) | 25 | 12 | 7 | 11 | 17 | 25 |
| Tensile strength at rupture (p.s.i.) | 1,240 | 900 | 400 | 1,000 | 1,600 | 3,900 |
| Percent elongation at rupture | 400 | 670 | 650 | 700 | 600 | 650 |

Another method, and probably the most suitable for large production runs, to form the semicrystalline stereoblock copolymers is by a continuous polymerization process. According to this process, the solvent, catalyst and a 1-olefin are introduced into the first polymerization vessel to form a homopolymer block B. After a selected period of time, the polymerization reaction mixture is transferred to a second polymerization vessel where a mixture of at least two 1-olefin monomers is introduced to form a copolymer block A. After the complete polymerization of the 1-olefin monomer mixture, the polymerization reaction mixture is transferred to a third vessel where a 1-olefin is introduced to form a second homopolymer block B, and, thereafter, alternating and successive copolymer and homopolymer blocks may be added to the polymeric chain in the same fashion. Continuity is achieved in that a successive series of polymerization reaction mixtures follows the first such mixture down through the chain of polymerization vessels.

The advantages of the copolymers of this invention may be summarized as follows:

(1) The crystallinity range (from about 4 to about 40 percent) indicates that these copolymers are highly suited for low temperature uses.

(2) The rather high tensile strengths represent an advantage over the related amorphous and crystallizable copolymers. The copolymers of this invention can be used with quite satisfactory results without reinforcement and/or cross-linking (vulcanization).

(3) Good elongation, with an elastic type of recovery after the initial elongation, presents a high degree of utility for end uses in which this characteristic is particularly significant. In other words, the properties of a vulcanized elastomer are achieved without the need for reinforcement or vulcanization.

Having thus described my invention, what I claim and desire to protect by Letters Patent is:

1. A semicrystalline block copolymer characterized by having the properties of a plastic material in the unoriented state and elastomeric properties in the oriented state and selected from the group consisting of the copolymers represented by the following formulae:

(I)         [A—B]$_n$
(II)        [A—A]$_n$
and
(III)       [B—B]$_n$ in which A is a copolymer block derived from at least two dissimilar 1-olefins, B is a homopolymer block formed from a 1-olefin, $n$ is a member of the series consisting of 0.5X, where X is an integer greater than 1, and in which, in the case of Formula I, when block B is a homopolymer having a crystallinity content above 40 percent, an adjacent block A is a copolymer having a crystallinity content of 40 percent or less; when block B is a homopolymer having a crystallinity content of from 4 to 40 percent, an adjacent block A is any copolymer; when block B is a homopolymer which is amorphous in the undeformed state but crystallizes upon being stretched, an adjacent block A is a copolymer having a crystallinity content of 4 percent or more; and when block B is an amorphous homopolymer, and adjacent block A is a copolymer having a crystallinity content above 40 percent;

in the case of Formula II, when a given block A is a copolymer having a crystallinity content of 4 percent or more, an adjacent block A is a copolymer having a crystallinity content of 40 percent or less, dissimilar combinations of monomers or different molar ratios of the same combination of monomers being used in forming each alternate block; and, in the case of Formula III, when a given block B is a homopolymer having a crystallinity content of 4 percent or more, an adjacent block B is a homopolymer having a crystallinity content of 40 percent or less, dissimilar 1-olefins being used in forming each alternate block;

said block copolymer having a crystallinity content, as determined by X-ray analysis, ranging from about 4 to about 40 percent.

2. The copolymer of claim 1, in which X ranges from 5 to 11.

3. The copolymer of claim 1, in which said crystalline homopolymer blocks having a crystallinity content above 40 percent, each contains from about 1000 to about 2000 molecules of ethylene;

said homopolymer blocks having a crystallinity content of from 4 to 40 percent each is selected from the group consisting of homopolymers containing from about 200 to about 1000 molecules of ethylene and homopolymers containing from about 1000 to about 2000 molecules of a 1-olefin having more than 2 carbon atoms per molecule;

said homopolymer blocks, which are amorphous in the undeformed state but crystallize upon being stretched, each is selected from the group consisting of homopolymers containing from about 20 to about 200 molecules of ethylene and homopolymers containing from about 200 to about 1000 molecules of a 1-olefin having more than 2 carbon atoms per molecule;

said amorphous homopolymer blocks each contains from about 20 to about 200 molecules of a 1-olefin having more than 4 carbon atoms per molecule;

said crystalline copolymer blocks having a crystallinity content above 40 percent, each contains from about 1000 to about 2000 monomer molecules consisting of ethylene and at least 1 dissimilar 1-olefin in a molar ratio selected from the following ethylene: dissimilar 1-olefin range: 99.8:0.2 to 98:2;

said copolymer blocks having a crystallinity content of from 4 to 40 percent each contains from about 500 to about 1000 monomer molecules consisting of ethylene and at least 1 dissimilar 1-olefin in a molar ratio selected from the following ethylene: dissimilar 1-olefin ranges: 0.2:99.8 to 2:98 and 98:2 to 95:5;

said copolymer blocks, which are amorphous in the undeformed state but crystallize upon being stretched, each contains from about 200 to about 500 monomer molecules consisting of 2 dissimilar 1-olefins in a molar ratio selected from the following ranges: 5:95 to 20:80 and 95:5 to 80:20;

and said amorphous copolymer blocks each contains from about 100 to about 2000 monomer molecules consisting of 2 dissimilar 1-olefins in a molar ratio selected from the range: 20:80 to 80:20.

4. The copolymer of claim 1 which is further characterized by being extractable in boiling n-heptane over a period of 48 hours to the extent of from about 65 to about 80 percent.

5. The copolymer of claim 1 which is further characterized, after having attained the oriented state through having been stretched to a 500–700 percent elongation, by exhibiting substantially complete recovery at elongation up to the rupture point.

6. The copolymer of claim 1, as represented by Formula I, in which block B is crystalline polyethylene and block A is an amorphous ethylene-propylene copolymer.

7. The copolymer of claim 1, as represented by Formula I, in which block B is crystalline polyethylene and block A is a crystallizable ethylene-propylene copolymer.

8. The copolymer of claim 1, as represented by Formula I, in which block B is crystalline polyethylene and block A is a semi-crystalline ethylene-butene-1 copolymer.

9. The copolymer of claim 1, as represented by Formula II, in which a given block A is an ethylene-propylene copolymer having a crystallinity content of from 4 to 40 percent and an adjacent block A is an ethylene-propylene copolymer which is amorphous in the underformed state but crystallizes upon being stretched.

10. The copolymer of claim 1, as represented by Formula III, in which a given block B is crystalline polyethylene and an adjacent block B is crystallizable polybutene-1.

11. The process of producing the copolymer of claim 1 by block polymerization of 1-olefins having the general formula $CH_2=CHR$, wherein R is selected from the group consisting of a hydrogen atom and alkyl radicals, which comprises sequentially forming polymeric blocks as defined in claim 1 by successively introducing in the formation of said homopolymer blocks, having a crystallinity content above 40 percent, from about 1000 to about 2000 molecules of ethylene;

in the formation of said homopolymer blocks, having a crystallinity content of from 4 to 40 percent, from about 200 to about 1000 molecules of ethylene or from about 1000 to about 2000 molecules of a 1-olefin having more than 2 carbon atoms per molecule;

in the formation of said homopolymer blocks, which are amorphous in the undeformed state but crystallize upon being stretched, from about 20 to about 200 molecules of ethylene or from about 200 to about 1000 molecules of a 1-olefin having more than 2 carbon atoms per molecule;

in the formation of said amorphous homopolymer blocks, from about 20 to about 200 molecules of a 1-olefin having more than 4 carbon atoms per molecule;

in the formation of said copolymer blocks, having a crystallinity content above 40 percent, from about 1000 to about 2000 monomer molecules consisting of ethylene and at least 1 dissimilar 1-olefin in a molar ratio selected from the following ethylene: dissimilar 1-olefin range: 99.8:0.2 to 98:2;

in the formation of said copolymer blocks, having a crystallinity content of from 4 to 40 percent, from about 500 to about 1000 monomer molecules consisting of ethylene and at least 1 dissimilar 1-olefin in a molar ratio selected from the following ethylene: dissimilar 1-olefin ranges: 0.2:99.8 to 2:98 and 98:2 to 95:5;

in the formation of said copolymer blocks, which are amorphous in the undeformed state but crystallize upon being stretched, from about 200 to about 500 monomer molecules consisting of 2 dissimilar 1-olefins in a molar ratio selected from the following ranges: 5:95 to 20:80 and 95:5 to 80:20;

and, in the formation of said amorphous copolymer blocks, from about 100 to about 200 monomer molecules consisting of 2 dissimilar 1-olefins in a molar ratio selected from the range: 20:80 to 80:20 into a polymerization zone containing from about 0.0001 to about 0.1 mole of a non-stereospecific catalyst per liter of inert liquid hydrocarbon solvent, the polymerization temperature being maintained in the range from about 0° to about 100° C., said non-stereospecific catalyst being selected from the group consisting of (1) mixtures of titanium tetrahalide and a member selected from the group consisting of lithium aluminum tetraalkyl and lithium alkyl-aluminum trialkyl and (2) mixtures of vanadium oxytrihalide and a member selected from the group consisting of aluminum trialkyl, alkyl aluminum dihalide, dialkyl aluminum halide, and mixtures of the latter two compounds.

12. The process of claim 11 in which, in forming a copolymer as represented by Formula I of claim 1, the 1-olefin used in the preparation of a homopolymer block is the same as one of the monomers used in the preparation of an adjacent copolymer block.

13. The process of claim 11 in which said nonstereospecific catalyst is a mixture of titanium tetrachloride and a lithium aluminum tetraalkyl in which the alkyl groups contain from 4 to 7 carbon atoms.

14. The process of claim 11 in which said nonstereospecific catalyst is a mixture of titanium tetrachloride and a lithium alkyl-aluminum trialkyl in which the alkyl groups contain from 4 to 7 carbon atoms.

15. The process of claim 11 in which said nonstereospecific catalyst is a mixture of vanadium oxytrichloride and an aluminum trialkyl in which the alkyl groups contain from 2 to 12 carbon atoms.

16. The process of claim 11 in which said nonstereospecific catalyst is a mixture of vanadium oxytrichloride and an alkyl aluminum halide in which the alkyl group contains from 2 to 12 carbon atoms.

17. The process of claim 11 in which said solvent is selected from the group consisting of aliphatic hydrocarbons boiling in the range from about 60° to about 100° C.

18. The process of claim 11 in which the pressure in said polymerization zone is in the range from almost zero up to about 100 p.s.i.g.

19. The process of claim 11 in which said polymerization zone is purged of unreacted gaseous reactants following the formation of individual blocks.

References Cited
UNITED STATES PATENTS
3,175,999   3/1965   Natta et al. _____ 260—878

FOREIGN PATENTS
785,314   10/1957   Great Britain.
594,018   5/1959   Italy.

MURRAY TILLMAN, *Primary Examiner.*

D. J. BREZNER, E. B. WOODRUFF, W. L. BASCOMB, *Assistant Examiners.*